United States Patent [19]

O'Neill

[11] Patent Number: 4,910,067

[45] Date of Patent: Mar. 20, 1990

[54] THERMOPLASTIC/FOAM CORE/FIBER-REINFORCED RESIN STRUCTURAL COMPOSITE MATERIAL, A PROCESS FOR MAKING SAID MATERIAL AND A BOAT STRUCTURE MADE FROM SAID MATERIAL

[76] Inventor: Michael A. O'Neill, 30 Diving St., Stonington, Conn. 06378

[21] Appl. No.: 383,809

[22] Filed: Jul. 21, 1989

[51] Int. Cl.$^4$ ................................................. B32B 3/26
[52] U.S. Cl. ..................................... 428/139; 156/79;
 264/45.3; 264/46.4; 428/309.9; 428/317.9
[58] Field of Search ................ 156/79; 264/45.3, 46.4;
 428/139, 309.9, 317.9

[56] References Cited

U.S. PATENT DOCUMENTS 3,493,449  2/1970  Krug ................................. 264/45.3
4,753,837  6/1988  Hanasa ............................ 428/309.9

Primary Examiner—William J. Van Balen
Attorney, Agent, or Firm—McCormick, Paulding & Huber

[57] ABSTRACT

A structural composite material is provided. The material comprises a thermoplastic layer, a layer of fibrous material spaced from the thermoplastic layer and a foam core disposed in the space between the layers. A resin impregnates and holds the layer of fibrous material together to form a fiber-reinforced resin structure. The foam core and the fiber-reinforced resin structure are integrally formed from a core material capable of having both a foamed character and a resinous character. A process for manufacturing the composite and a boat structure formed from the material are also provided.

38 Claims, 2 Drawing Sheets

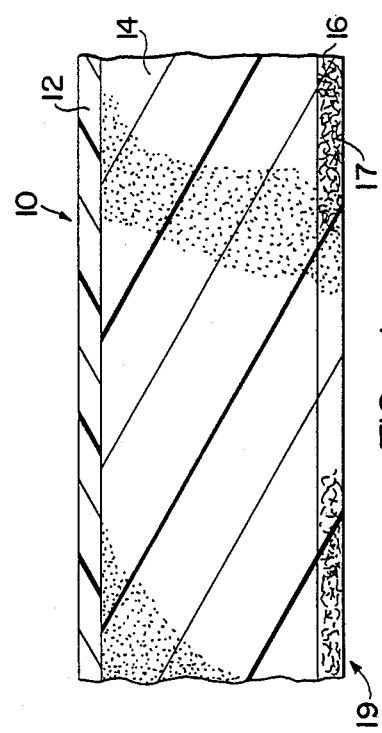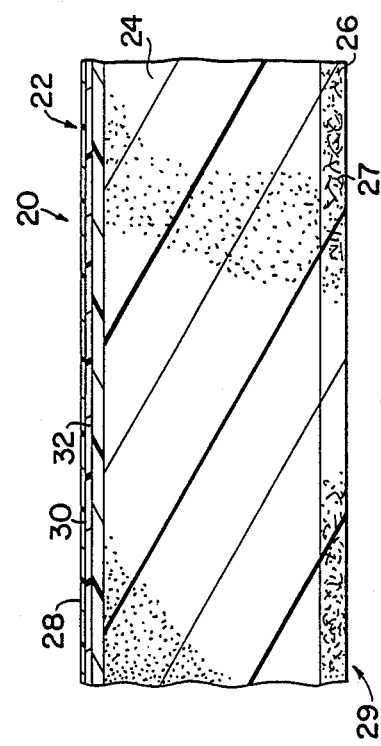

THERMOPLASTIC/FOAM CORE/FIBER-REINFORCED RESIN STRUCTURAL COMPOSITE MATERIAL, A PROCESS FOR MAKING SAID MATERIAL AND A BOAT STRUCTURE MADE FROM SAID MATERIAL

BACKGROUND OF THE INVENTION

The present invention relates to a structural composite material. More particularly, the present invention provides a foam core/ fiber-reinforced structural composite material. The invention further provides a method for manufacturing the composite and a boat structure made from the material.

To date, a wide variety of structural composite materials have been developed. Generally, such materials are formed by laminating either a thermoplastic or thermoset skin to one or both sides of a rigid foam core. Structural composites find use in applications where light weight, strength, surface finish and economy are important such as, for example in the automotive, aircraft and boat building industries.

In the case of structural members formed from thermoplastic/foam composites, strength and stiffness are provided by incorporating a rib or other framing member at strategic points within the structural member. Depending on the function of the structural member and the specifications it must meet, such an approach may be impracticable or impossible.

Prior art thermoplastic/foam composites also present a number of problems associated with the thermoplastic skin that covers the foam core. Generally, the thermoplastic surfaces of such composites are soft and easily scratched; they exhibit low gloss, poor weatherability and problems with adhesion are frequently encountered. For example, thermoplastic skins formed from ABS exhibit poor weatherability, embrittle quickly and show a sharp decline in impact resistance over time. Such a surface would quickly fail if used, for example, as the outer surface of a boat.

Thermoplastic skins formed from an EPDM-rubber modified styrene-acrylonitrile copolymer (hereinafter AES thermoplastic) eliminate some of these problems. AES thermoplastic exhibits better weatherability, chemical resistance and impact resistance than ABS. However, the problems of overall strength and rigidity discussed above are not mitigated by the use of AES.

Fiber-reinforced foam composites offer improved strength and rigidity compared with thermoplastic/foam composites. Fiber-reinforced foam composites are commonly manufactured by molding a foam core and, after the foam core has cured, laminating a fiber-reinforced resin layer to the core's surface. The prior art is limited to manual, open mold processes for laminating the fiber-reinforced resin layer to the foam core. Generally, the foam core is covered with a layer of fibrous material, and a thermoplastic or thermoset resin is applied by hand or by spraying. The resin impregnates the fibrous material and penetrates into the foam. Once the resin cures and hardens, a fiber-reinforced resin layer is firmly bonded to the foam core.

Prior art methods of manufacturing fiber-reinforced foam composites present several important disadvantages. First, a uniform layer of the fiber-reinforced resin cannot be obtained when the resin is applied manually or by spraying. Thus, the final product lacks consistency in thickness, density and resin content. Such inconsistencies can cause localized areas of reduced strength in structural members made from the composite. Moreover, the difficulties associated with mating structural members having non-uniform thickness must be addressed. Foam/resin delamination also frequently occurs in areas of the composite where the resin content is low or completely absent.

Second, the hand lay-up or hand spray-up methods taught by the prior art result in the emission of significant quantities of chemicals into the work place. For example, such methods often involve the use of styrene, a substance which OSHA and a number of other health organizations are currently investigating as a possible carcinogen. In the light of the potential hazards associated with styrene, OSHA has issued a proposed regulation which limits the level of free styrene in the work place to 50ppm. A recent study concluded that compliance with OSHA's proposed regulation would cost open molders in the reinforced plastics industry $1.6 billion. In addition, the study projects that the annual operating cost of maintaining this safety level would be $500 million.

Co-pending patent application, filed Jul. 21, 1989, assigned Ser. No. 383,811 and naming the above-named inventor, discloses a thermoplastic/foam core/fiber-reinforced thermoset resin composite manufactured in a closed mold process. The composite is manufactured by forming a thermoplastic layer, applying a foam core to one surface of the thermoplastic layer and then laminating a fiber-reinforced thermoset resin to the foam core in a resin transfer molding process. This method of manufacture significantly reduces the emission of chemicals and produces a final product having uniform thickness, density and resin content. However, where the method is employed to produce large structural members, a substantial clamping force must be applied to the matched die mold in which the resin transfer molding process is carried out to ensure that tolerances are maintained. Clamping devices capable of exerting the required forces are expensive and not generally available to molders operating small shops.

It is, therefore, an object of the present invention to provide a process for making a foam core/fiber-reinforced structural composite that significantly reduces the free air emissions of hazardous chemicals such as styrene.

It is a further aim of the invention to provide a method for manufacturing such a composite that molders throughout the reinforced plastics industry will find economical.

It is a still further aim of the invention to provide a foam core/fiber-reinforced resin composite having controlled uniformity of thickness, density and resin content.

It is a further aim of the invention to provide a foam core/fiber-reinforced resin composite having a highly cosmetic, impact resistant, chemical resistant and weatherable surface.

It is a still further aim of the invention to provide a boat structure made from such a composite.

SUMMARY OF THE INVENTION

The present invention meets the above-stated objects by providing a structural composite material comprising a thermoplastic layer, a layer of fibrous material spaced from the thermoplastic layer and a foam core disposed in the space between the thermoplastic layer and the layer of fibrous material. The layer of fibrous material further includes a resin which impregnates and holds the layer of fibrous material together to form a fiber-reinforced resin structure. The composite material exhibits controlled uniformity of thickness, density and resin content throughout.

In a preferred form of the invention, the thermoplastic layer forms the outer layer of the material and is itself a composite comprising an outer acrylic film, an intermediate layer of a high impact, weather resistant and chemical resistant polymer, and a substrate of impact-grade ABS.

The layer of fibrous material may be formed from any suitable reinforcing fibers, and in the preferred embodiment bidirectional fiberglass is used.

A core material capable of having both a foamed character and a resinous character joins the thermoplastic layer and the layer of fibrous material. The foam core disposed in the space between the thermoplastic layer and the layer of fibrous material is formed from the portion of the core material which exhibits a foamed character. Preferably, the core material is a foamable urethane resin which forms a rigid urethane foam of the closed cell type. The resin which impregnates and holds the layer of fibrous material together to form the fiber-reinforced resin structure is derived from the portion of the core material which exhibits a resinous character.

The present invention further provides a process for manufacturing the structural composite. According to the process, a thermoplastic layer is provided in a desired shape. In a preferred embodiment of the process, the thermoplastic layer is shaped by vacuum forming. A layer of fibrous material is provided in spaced relationship to the thermoplastic layer. A foam is introduced into the space between the thermoplastic layer and the fibrous layer and is allowed to expand until the entire space is filled. As the foam expands and fills the space, the foam cells lying adjacent to and in contact with the fibrous material convert to a liquid resin. The resin wicks through and completely wets the fibrous layer to form a fiber-reinforced resin structure.

In one embodiment of the invention, a defoaming agent capable of converting the cells of a foam to a liquid resin is applied to the layer of fibrous material prior to the introduction of the foam into the space between the thermoplastic layer and the layer of fibrous material. As the foam expands and fills the space, the foam cells lying adjacent to and in contact with the fibrous layer are converted to a liquid resin by the defoaming agent. The liquid resin then wicks through and completely wets the layer of fibrous material to form a fiber-reinforced resin structure.

The closed mold process taught by the present invention significantly reduces the free-air emissions of hazardous chemicals. Moreover, since the material is formed in a closed mold process, tolerances can be closely controlled and the resulting product exhibits uniform thickness, density and resin content. Finally, since the fiber-reinforced resin structure is formed simultaneously with the foam core, the pressure within the mold is substantially reduced over that required to form such a structure in a resin injection molding process. Thus, in the present invention, far less clamping force is needed to meet the tolerances required of the final product.

The present invention also provides a boat made from the structural composite material. The boat is made in essentially three processes. A hull, primary deck and secondary deck are formed through the process outlined above. The pieces are them assembled by epoxy bonding along appropriate contact surfaces.

DESCRIPTION OF THE DRAWINGS

FIG. 1 is a sectional view of a first embodiment of the structural composite taught by the present invention.

FIG. 2 is a sectional view of a second embodiment of the structural composite taught by the present invention.

DETAILED DESCRIPTION OF THE INVENTION

I The Structural Composite Material

Figure 3:
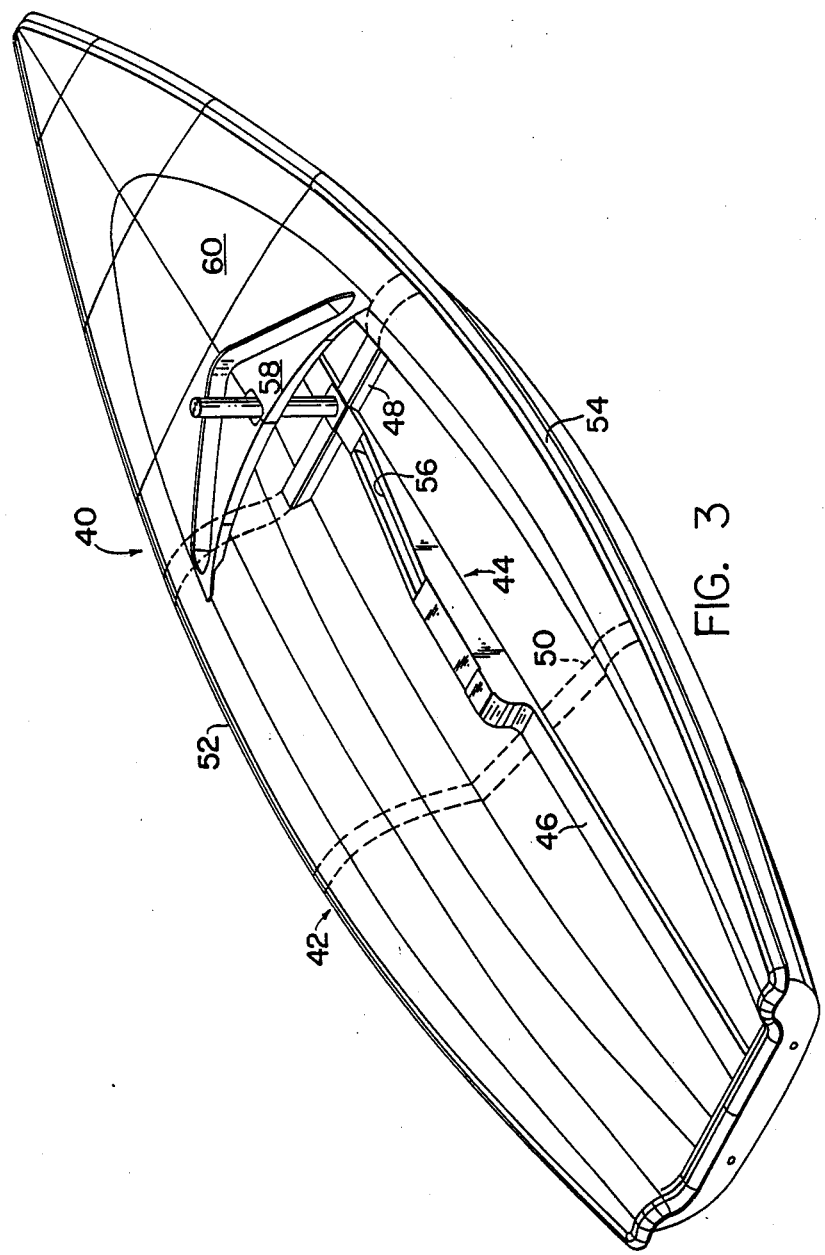
FIG. 3 is a perspective view of a boat made from the structural composite of the present invention.

FIG. 1 illustrates a first embodiment of the structural composite material taught by the present invention. The material 10 comprises an outer thermoplastic layer 12, a rigid foam core 14 and an inner layer 16 of fibrous material. The layer 16 is impregnated and held together with a resin 17 to form a fiber-reinforced resin structure 19. The fiber-reinforced resin structure 19 is formed integrally with the foam core 14.

The outer thermoplastic layer 12 may be made from any suitable thermoplastic material. The thermoplastic chosen for the outer layer 12 depends largely on the environment in which the composite functions. Characteristics typically required of the thermoplastic may include but are not limited to, for example, high impact resistance, good weatherability, chemical resistance and high grade cosmetics.

A core material capable of having a foamed character and a resinous character joins the thermoplastic layer 12 and the layer of fibrous material 16. Preferably, the core material comprises a foamable urethane resin. The foam core 14 is formed from the portion of the core material which exhibits a foamed character. Most preferably, the core is a rigid urethane foam, and where the composite is intended for use in the water or other wet environments, a foam of the closed cell type is employed. The foam core does more than fill the space between the thermoplastic layer 12 and the layer of fibrous material 16. The foam core enhances the impact resistance of the material and acts as an adhesive to bond the layers 12 and 16 into a rigid structure.

The layer of fibrous material comprises any suitable fiber reinforcing material such as, for example, woven roving fiberglass, mat fiberglass, undirectional fiberglass, bidirectional fiberglass, polyamide fibers, graphite fibers and polyethylene fibers. The resin 17 which impregnates and holds together the layer of fibrous material 16 to form the fiber-reinforced resin structure 19 is derived from the portion of the core material which exhibits a resinous character. The fiber-reinforced resin structure provides the major structural support for the composite material and is formed integrally with the foam core 14.

FIG. 2 illustrates a second embodiment of the structual composite material taught by the present invention. The composite 20 includes an outer thermoplastic layer 22 which is itself a composite, a rigid urethane foam core 24 and an inner layer 26 of bidirectional fiberglass. The fiberglass is impregnated and held together with a urethane resin 27 to form a fiber-reinforced resin structure 29.

The outer thermoplastic layer 22 is a laminated thermoplastic sheet including an outer acrylic film 28 laminated to a co-extrusion comprising a layer of a high impact, weather resistant and chemical resistant polymer 30, and a layer of an impact-grade ABS 32.

The outer acrylic film 28 provides a lustrous, scratch resistant, cosmetic surface for the composite 20 and may be formed from any suitable acrylic such as, for example, "KORAD L" available from Polymer Extruded Products, Newark, NJ.

The polymer layer 30 is formed from any suitable high impact, weather resistant and chemical resistant polymer such as, for example, AES, acrylic ester modified styrene acrylonitrile terpolymer (hereinafter ASA), ABS, PVC, and polycarbonate polymers. Preferably, the polymer layer 30 consists of an AES thermoplastic such as, for example, "ROVEL" available from The Dow Chemical Company, Midland, MI. The copolymer enhances the composite's impact resistance, weatherability, crack resistance and chemical resistance. The copolymer also adds to the highly cosmetic appearance of the composite's outer surface.

The impact-grade ABS layer 32 further enhances the impact resistance of the composite 20 and also adds to the durability and rigidity of the material. Any suitable impact-grade ABS may be used such as, for example, "MAGNUM" ABS available from The Dow Chemical Company, Midland, MI.

The structure of the outer thermoplastic layer 22 is not, of course, limited to that set forth above. As mentioned previously, the composition of the outer thermoplastic layer depends primarily on the environment in which the composite functions. For example, where the composite is used to form structural members for indoor applications which require toughness, durability and rigidity, the thermoplastic layer 22 may be formed from ABS alone.

In applications which require all of the above plus good weatherability, the thermoplastic layer 22 is formed from a system including a weatherable polymer such as, for example, an AES or ASA thermoplastic and an impact-grade ABS. As noted previously, a suitable AES thermoplastic is "ROVEL" available from The Dow Chemical Company, Midland, MI. Suitable ASA thermoplastics include, for example, "GE LOY" available from the General Electric Company, Pittsfield, MA, "CENTREX" available from the Monsanto Company, St. Louis, MO, and "LURAN" available from BASF-Wyandotte Corp. Parsippany, NJ. If, in addition, a highly cosmetic surface is required, then an acrylic film may be added to the weatherable polymer/ABS system.

A urethane core material capable of having both a foamed character and a resinous character joins the layers 22 and 26 together. The foam core 24 is a rigid urethane foam of the closed cell type and is formed from the portion of the urethane core material which exhibits a foamed character. The foam core has a final density in the range of from 1–25 PCF, preferably 3–12 PCF and most preferably 6–8 PCF. The foam core 24 acts as an adhesive which bonds the thermoplastic outer layer 22 and the inner layer of fiberglass 26 together to add strength and rigidity to the composite 20. The foam core further improves the composite's impact resistance.

The urethane resin 27 which impregnates and holds together the inner layer of bidirectional fiberglass 26 to form the fiber-reinforced resin structure 29 is derived from the portion of the urethane core material which exhibits a resinous character. The fiber-reinforced resin structure 29 provides the major structural support for the composite material and is formed integrally with the foam core 24.

II The Process for Manufacturing the Structural Composite

To form the structural composite of the present invention, a thermoplastic layer is provided in a shape which corresponds to the overall shape of the structural member which will be formed from the composite. The thermoplastic layer may be shaped by any procedure known to those skilled in the art, but preferably it is shaped in a vacuum forming process.

In the case of the composite material 20 shown in FIG. 2, the thermoplastic layer 22 is formed from an extruded laminated sheet which comprises the outer acrylic film 28 and the co-extrusion of polymer layer 30 and ABS layer 32. The sheet is heated at 300–400 degrees F. for 4–5 minutes and then placed in an aluminum-filed epoxy mold having a molding surface which corresponds to the desired shape of the layer 22. The mold is sealed, and the sheet is subjected to a vacuum forming process of the type well known to those skilled in the art to form the thermoplastic layer 22.

In the second stage of the process, a rigid urethane foam core is applied to the shaped thermoplastic layer, and, at the same time, the fiber-reinforced resin structure is formed. Again referring to the composite material illustrated in FIG. 2, the surface of the ABS layer 32 to which the foam core 24 is applied is treated to promote adhesion. Methods for treating the ABS surface for this purpose are well known to those skilled in the art and include, for example, etching by means of solvent wiping and oxidation through flame treatment. The thermoplastic layer 22 is then transferred to an aluminum-filled epoxy matched die mold. The layer 22 is placed against the molding surface of the mold's lower half. The top half or lid of the matched die mold is constructed so that when the lid and the lower half of the mold are mated, a mold cavity is disposed adjacent the treated surface of the ABS layer 32.

Adhesive is then applied to the lid's molding surface, and pre-cut dry bidirectional fiberglass is arranged on the lid's molding surface so that it completely covers the surface with a uniform layer. The layer of bidirectional fiberglass 26 is bonded in place on the molding surface by the adhesive.

The lid and the mold's lower half are then mated, and a prescribed amount of a rigid urethane foam of the closed cell type is injected into the cavity disposed adjacent the treated surface of the ABS layer. The cavity represents the tolerance of the foam core 24 and the fiberglass-reinforced resin structure 29. The foam is allowed to expand to completely fill the cavity and until the foam has a final density of 6–8 PCF.

As the expanding foam reaches the fiberglass layer 26, the foam cells lying adjacent to and in contact with the fiberglass convert to a liquid resin. The resin wicks through and completely wets the fiberglass layer 26 to form the fiberglass-reinforced resin structure 29. The composite is then cured in the mold for 20–30 minutes.

In a second embodiment of the invention, the layer of fiberglass is lightly sprayed with an defoaming agent capable of converting the cells of a foam to a liquid resin. Any defoaming agent suitable for this purpose may be employed including, but not limited to, defoaming agents such as, methyl ethyl ketone and Byk-A 500 available from Byk-Chemie USA, Wallingford, CT. It is believed that the defoaming agent lowers the surface tension of the foam cells in contact with the fiberglass and converts them into liquid urethane resin.

The advantages offered by the present invention with regard to providing a consistent final product are illustrated in Tables I and II. Five different composite materials are designated in Table I. Material A is a thermoplastic/foam core/fiber-reinforced resin structural composite made according to the present invention. Materials B, C, D and E are prior art structural composites. Table II lists the average weight and mean deviation of five 4"×4" square plaques cut from panels formed from each of the five different composites. As Table II clearly illustrates, the weight consistency of the composite material made according to the present invention is far superior to that achieved by prior art structural composites.

TABLE I

| DESIGNATION | SYSTEM THERMOPLASTIC LAYER | FOAM CORE | FIBER-REINFORCED RESIN LAYER |
|---|---|---|---|
| A | AES/ABS 0.156" | URETHANE (3.5 lb. Density) | BIAXIAL MATTE (12 oz)/Urethane |
| B | AES/ABS 0.156" | NONE | BIAXIAL MATTE (12 oz)/Polyester |
| C | GELCOAT/ BIAXIAL MATTE (12 oz)/ Polyester | AIREX (PVC) | BIAXIAL MATTE (12 oz)/Polyester |
| D | GELCOAT/ BIAXIAL MATTE (12 oz)/Polyester | NONE | BIAXIAL MATTE/ polyester MATTE (Chopped Strand) |
| E | GELCOAT/ BIAXIAL MATTE (12 oz)/Polyester | NONE | |

TABLE II

| DESIGNATIONS | WEIGHT (GRAMS) OF 4" × 4" SQUARE PLAQUE |
|---|---|
| A | 55 ± 2 |
| B | 55.5 ± 8 |
| C | 84 ± 12 |
| D | 86 ± 12 |
| E | 44 ± 8 |

III A Boat Constructed from the Structual Composite

FIG. 3 illustrates a boat constructed from structural panels made of the composite shown in FIG. 2. The boat 40 comprises a hull 42 which is formed in one piece according to the process set forth above. The thermoplastic layer 22 shown in FIG. 2 forms the outside surface of the hull and the fiberglass-reinforced resin structure 29 forms the hull's inner surface.

Integrally molded with hull 42 is fiberglass reinforced frame 44. The frame includes a four inch wide center beam 46 which runs the length of the hull. The frame 44 further includes four inch wide bulkheads 48, 50 which extend from the center beam to the gunwales 52, 54. Center beam 46 is fitted with a slot 56 lined with polyester-fiberglass to accommodate a centerboard (not shown).

The boat further comprises primary deck 58 and secondary deck 60. The primary and secondary decks are epoxy bonded to the hull along the gunwales and other contact surfaces.

While preferred embodiments have been shown and described, various modifications and substitutions may be made without departing from the spirit and scope of the invention. Accordingly, it is to be understood that the present invention has been described by way of example and not by limitation.

In the claims:

1. A structural composite material comprising:
   a thermoplastic layer having an outer surface and an inner surface;
   a layer of fibrous material disposed in a first region spaced from the inner side of the thermoplastic layer, and
   a core material capable of having a foamed character and a resinous character joining said thermoplastic layer and said layer of fibrous material, said core material having a foamed character defined by a multiplicity of foam cells in a second region between said inner surface of the thermoplastic layer and said first region of fibrous material and having a resinous character impregnating and holding together the layer of fibrous material to form a fiber-reinforced resin structure in said first region, said composite material having controlled uniformity of thickness, density and resin content throughout.

2. The structural composite material of claim 1 wherein said thermoplastic layer comprises an impact-grade ABS.

3. The structural composite material of claim 1 wherein said thermoplastic layer comprises a first layer of a high impact, weather resistant and chemical resistant polymer and a second layer of an impact-grade ABS.

4. The structural composite material of claim 1 wherein said layer of thermoplastic material comprises an acrylic film, a first layer of a high impact, weather resistant and chemical resistant polymer, and a second layer of impact-grade ABS.

5. The structural composite material of claim 1 wherein said thermoplastic layer comprises an outer acrylic film, an intermediate layer of a high impact, weather resistant and chemical resistant polymer and an inner substrate of impact-grade ABS.

6. The structural composite material of claim 3 wherein said first layer comprises a polymer selected from the group consisting of polycarbonate, PVC, ASA and AES polymers.

7. The structural composite material of claim 6 wherein said first layer comprises an EPDM-rubber modified styrene-acrylonitrile copolymer.

8. The structural composite material of claim 5 wherein said intermediate layer comprises a polymer selected from the group consisting of polycarbonate, PVC, ASA and AES polymers.

9. The structural composite material of claim 8 wherein said intermediate layer comprises an EPDM-rubber modified styrene-acrylonitrile copolymer.

10. The structural composite material of claim 1 wherein said core material in said second region comprises a rigid urethane foam.

11. The structural composite material of claim 10 wherein said rigid urethane foam is of the closed cell type.

12. The structural composite of claim 1 wherein said fibrous material is selected from the group consisting of woven roving fiberglass, mat fiberglass, undirectional fiberglass, bidirectional fiberglass, polyamide fibers, graphite fibers and polyethylene fibers.

13. The structural composite material of claim 12 wherein said fibrous material is bidirectional fiberglass.

14. A structural composite material comprising:
an outer thermoplastic layer, said outer layer having an outer acrylic film, an intermediate layer of an EPDM-rubber modified styrene-acrylonitrile copolymer and an inner substrate of an impact-grade ABS;
an inner layer of bidirectional fiberglass disposed in a first region spaced from said inner substrate;
a urethane core material capable of having a foamed character and a resinous character joining said thermoplastic layer and said inner layer of bidirectional fiberglass, said urethane core material having a foamed character defined by a multiplicity of closed foam cells in a second region between said inner substrate and the inner layer of bidirectional fiberglass and a resinous character impregnating and holding the bidirectional fiberglass together to form a fiberglass reinforced resin structure in said first region,
said structural composite material having controlled uniformity of thickness, density and resin content throughout.

15. A process for manufacturing a structural composite material comprising the steps of:
(a) providing a thermoplastic layer in a desired shape, said layer having an exposed surface and an inner surface;
(b) providing a layer of fibrous material in spaced relationship to the inner surface of said thermoplastic layer;
(c) introducing a foam into the space between the inner surface of the thermoplastic layer and the layer of fibrous material and allowing the foam to expand and completely fill the space, wherein the foam cells adjacent the layer of fibrous material and in contact with said fibrous material convert to a liquid resin which wicks through and completely wets the layer of fibrous material to form a thermoplastic/foam/fiber reinforced resin structure composite.

16. The process set forth in claim 15 where step (a) is further characterized in that said thermoplastic layer is vacuum formed.

17. The process set forth in claim 15 wherein step (a) is further characterized in that said thermoplastic layer comprises an impact-grade ABS.

18. The process set forth in claim 15 wherein step (a) is further characterized in that said thermoplastic layer comprises a first layer of a high impact, weather resistant and chemical resistant polymer and a second layer of an impact grade ABS.

19. The process set forth in claim 15 wherein step (a) is further characterized in that said thermoplastic layer comprises an outer acrylic film, an intermediate layer of a high impact, weather resistant and chemical resistant polymer and a substrate of an impact-grade ABS.

20. The process set forth in claim 18 wherein said polymer is selected from the group consisting of polycarbonate, PVC, ASA and AES thermoplastics.

21. The process set forth in claim 20 wherein said polymer comprises an EPDM-rubber modified styrene-acrylonitrile copolymer.

22. The process set forth in claim 19 wherein said polymer is selected from the group consisting of polycarbonate, PVC, ASA and AES thermoplastics.

23. The process set forth in claim 22 wherein said polymer is an EPDM-rubber modified styrene-acrylonitrile copolymer.

24. The process set forth in claim 15 wherein step (a) comprises:
(A) extruding a laminated thermoplastic sheet, said sheet including a co-extrusion of a high impact, weather resistant and chemical resistant polymer and an impact-grade ABS, and an acrylic film laminated to the exposed surface of said polymer;
(B) heating said thermoplastic sheet;
(C) placing the sheet over the surface of a mold, and
(D) subjecting said sheet to a vacuum forming process to form said thermoplastic layer.

25. The process set forth in claim 24 wherein step (B) comprises heating said thermoplastic sheet at 300–400 degrees F. for a period of 4–5 minutes.

26. The process set forth in claim 15 wherein step (b) comprises:
(E) treating the inner surface of the thermoplastic layer to promote adhesion;
(F) providing a matched die mold having a bottom section and a lid section;
(G) placing said thermoplastic layer in the bottom section of the matched die mold, said mold construction so that when the lid section of the mold is put in place a mold cavity is disposed adjacent the inner surface of the thermoplastic layer;
(H) applying adhesive to the mold surface of the lid section, and
(I) adhering a uniform layer of dry fibrous material to the mold surface of the lid section.

27. The process set forth in claim 26 wherein step (I) is further characterized in that said fibrous material is selected from the group consisting of woven roving fiberglass, mat fiberglass, unidirectional fiberglass, bidirectional fibeglass, polyamide fibers, graphite fibers and polyethylene fibers.

28. The process set forth in claim 27 wherein said fibrous material is bidirectional fiberglass.

29. The process set forth in claim 15 wherein step (b) comprises the step of:
(J) spraying a defoaming agent onto the layer of fibrous material capable of converting the cells of a foam to a liquid resin.

30. The process set forth in claim 29 wherein step (J) is further characterized in that said defoaming agent is selected from the group consisting of Byk-A 500 and methyl ethyl ketone.

31. The process of claim 30 wherein said defoaming agent is Byk-A 500.

32. The process of claim 15 wherein step (d) comprises:

(K) joining said lid section and said bottom section of said matched die mold to form said cavity disposed adjacent the inner surface of said thermoplastic layer;

(L) injecting a urethane foam into said cavity;

(M) allowing the urethane foam to expand until a prescribed foam density is reached, wherein the foam completely fills the mold cavity and the foam cells adjacent to and in contact with the layer of fibrous material convert to a liquid urethane resin which wicks through and completely wets the fibrous layer to form a thermoset layer/foam core/fiber reinforced urethane resin composite, and (N) curing said thermoplastic layer/foam core/fiber reinforced urethane resin composite in the mold.

33. The process set forth in claim 32 further characterized in that said urethane foam is a rigid urethane foam of the closed cell type.

34. The process set forth in claim 33 wherein said foam has a final density of 6-8 PCF.

35. A process for manufacturing a structural composite material comprising the steps of:

extruding a laminated thermoplastic sheet, said sheet including a co-extrusion of an EPDM-rubber modified styrene-acrylonitrile copolymer and an impact-grade ABS, and an acrylic film laminated to the exposed surface of said copolymer;

heating said thermoplastic sheet at 300-4000 degrees F. for a period of 4-5 minutes;

placing the heated thermoplastic sheet over an aluminum-filled epoxy mold and subjecting the sheet to a vacuum forming process to form a thermoplastic outer layer, said thermoplastic outer layer having an exposed surface of acrylic film and an inner surface of an impact-grade ABS;

treating the inner surface of the thermoplastic outer layer to promote adhesion;

providing a mathched die mold made from aluminum-filled epoxy, said mold having a bottom section and a lid section;

placing the thermoplastic outer layer in the bottom section of the matched die mold, said mold constructed so that a mold cavity is disposed adjacent the inner surface of the outer thermoplastic layer;

applying adhesive to the molding surface of the lid section of the matched die mold;

adhering a uniform layer of bidirectional fiberglass to the molding surface of the lid section;

joining said lid section and said bottom section of said matched die mold to form said mold cavity disposed adjacent the inner surface of said outer thermoplastic layer;

injecting a rigid urethane foam of the closed cell type into said mold cavity;

allowing the foam to expand until a foam density of 6-8 PCF is reached, wherein the urethane foam completely fills the mold cavity and the foam cells adjacent to and in contact with the layer of bidirectional fiberglass convert to a liquid urethane resin which wicks through and completely wets the fiberglass to form a thermoplastic outer layer/urethane foam core/fiberglass-reinforced urethane resin inner structure composite, and curing said thermoplastic outer layer/urethane foam core/ fiberglass-reinforced urethane resin inner structure composite in the mold for 20-30 minutes.

36. A process for manufacturing a structural composite material comprising the steps of:

extruding a laminated thermoplastic sheet, said sheet including a co-extrusion of an EPDM-rubber modified styrene-acrylonitrile copolymer and an impact-grade ABS, and an acrylic film laminated to the exposed surface of said copolymer;

heating said thermoplastic sheet at 300-4000 degrees F. for a period of 4-5 minutes;

placing the heated thermoplastic sheet over an aluminum-filled epoxy mold and subjecting the sheet to a vacuum forming process to form a thermoplastic outer layer, said thermoplastic outer layer having an exposed surface of acrylic film and an inner surface of an impact-grade ABS;

treating the inner surface of the thermoplastic outer layer to promote adhesion;

providing a matched die mold made from aluminum-filled epoxy, said mold having a bottom section and a lid section;

placing the thermoplastic outer layer in the bottom section of the matched die mold, said mold constructed so that a mold cavity is disposed adjacent the inner surface of the outer thermoplastic layer;

applying adhesive to the molding surface of the lid section of the matched die mold;

adhering a uniform layer of bidirectional fiberglass to the molding surface of the lid section;

spraying a defoaming agent onto the layer of fibrous material, said defoaming agent capable converting the cells of a foam to a liquid resin;

joining said lid section and said bottom section of said matched die mold to form said mold cavity disposed adjacent the inner surface of said outer thermoplastic layer;

injecting a rigid urethane foam of the closed cell type into said mold cavity;

allowing the foam to expand until a foam density of 6-8 PCF is reached, wherein the urethane foam completely fills the mold cavity and the foam cells adjacent the layer of bidirectional fiberglass and in contact with the defoaming agent are collapsed and converted to a liquid urethane resin which wicks through and completely wets the fiberglass to form a thermoplastic outer layer/urethane foam core/-fiberglass-reinforced urethane resin inner structure composite, and curing said thermoplastic outer layer/ urethane foam core/ fiberglass-reinforced urethane resin inner structure composite in the mold for 20-30 minutes.

37. A structural composite material made according to the process set forth in claim 15.

38. A boat structure formed from a structural composite material comprising:

an outer thermoplastic layer, said outer layer having an outer acrylic film, an intermediate layer of an EPDM-rubber modified styrene-acrylonitrile copolymer and an inner substrate of an impact-grade ABS;

an inner layer of bidirectional fiberglass disposed in a first region spaced from said inner substrate, and a urethane core material capable of having a foamed character and a resinous character joining said thermoplastic layer and said inner layer of bidirectional fiberglass, said urethane core material having a foamed character defined by a multiplicity of closed foam cells in a second region between said inner substrate and said inner layer of bidirectional fiberglass and a resinous character impregnating and holding the bidirectional fiberglass together to form a fiberglass reinforced resin structure in said first region, said structural composite material having controlled uniformity of thickness, density and resin content throughout.

* * * * *